(12) United States Patent
Greywall (10) Patent No.: US 6,690,850 B1
(45) Date of Patent: Feb. 10, 2004

(54) ARTICLE COMPRISING A REFLECTION-TYPE SPECTRAL EQUALIZER/OPTICAL SWITCH

(75) Inventor: Dennis S. Greywall, Whitehouse Station, NJ (US)

(73) Assignees: Agere Systems Inc., Allentown, PA (US); Lucent Technologies Inc, Murray Hill, NJ (US)

( * ) Notice: Subject to any disclaimer, the term of this patent is extended or adjusted under 35 U.S.C. 154(b) by 59 days.

(21) Appl. No.: 09/874,338

(22) Filed: Jun. 5, 2001

(51) Int. Cl.[7] .................................. G02B 6/26
(52) U.S. Cl. ..................... 385/18; 385/14; 385/17; 359/223; 359/291; 359/298; 398/82
(58) Field of Search ............... 359/223, 224, 359/226, 290, 291, 298, 128; 385/17, 18, 14; 398/82

(56) References Cited

U.S. PATENT DOCUMENTS

| | | | | |
|---|---|---|---|---|
| 4,317,611 A | * | 3/1982 | Petersen | ..................... 359/214 |
| 5,739,941 A | * | 4/1998 | Knipe et al. | ................. 359/224 |
| 5,969,465 A | * | 10/1999 | Neukermans et al. | ....... 310/333 |
| 6,415,070 B1 | * | 7/2002 | Munoz-Bustamante et al. | . 359/118 |
| 6,594,057 B1 | * | 7/2003 | Drake et al. | ................. 359/224 |
| 2001/0021058 A1 | * | 9/2001 | McClelland et al. | ........ 359/223 |

* cited by examiner

Primary Examiner—Evelyn Lester (57) ABSTRACT

An array of movable reflective elements provides wavelength independent performance in spectral equalizers and other optical devices. Each movable reflective element comprises a reflective plate that is suspended by rod-like supports that have a width of less than 2 microns and as small as about 0.25 to 0.35 microns. Semiconductor processing techniques are used to form the rod-like supports. An improved spectral equalizer incorporates the array of movable reflective elements, a controller, collimating/focusing optics and a diffraction element that optically communicate in a free-space optics arrangement.

22 Claims, 7 Drawing Sheets

ARTICLE COMPRISING A REFLECTION-TYPE SPECTRAL EQUALIZER/OPTICAL SWITCH

FIELD OF THE INVENTION

The present invention relates generally to microelectromechanical devices for use in optical systems. More particularly, the present invention relates to improved spectral equalizers and optical switches.

BACKGROUND OF THE INVENTION

As wavelength-division-multiplexed ("WDM") signals propagate through a fiber optic network, they lose strength. To compensate, the signals are amplified at various points in the network, using, for example, an Erbium-doped fiber amplifier.

Erbium-doped fiber amplifiers amplify each of the channels (i.e., wavelengths or spectral components) comprising a WDM transmission, but provide an uneven gain across the spectrum. In other words, some spectral components or wavelengths are amplified to a far greater extent than others. And this disparity in signal strength grows as a result of multiple cycles of losses and amplification. Uncorrected, the signal-strength disparity results in transmission errors. Consequently, a fiber optic network should incorporate a means for smoothing-out or equalizing such wavelength-to-wavelength disparities.

Early techniques for spectral equalization involved selectively pre-emphasizing the signal strength of certain channels, or using fixed wavelength-selective fiber gratings or using individual attenuators that are placed between wavelength routers. Each of these approaches disadvantageously impacts network flexibility.

Recent proposals for spectral equalization involve spatially resolving the plural spectral components of a WDM signal and delivering them to either (1) individual optical modulators (U.S. Pat. No. 5,745,271) or (2) a continuous modulator "strip" (U.S. Pat. No. 5,943,158). Both of these modulator configurations utilize an optical interference principle wherein the reflectivity of the modulator is varied by changing the size of an optical cavity. By appropriately varying the reflectivity of: (1) the individual optical modulators or (2) regions along the modulator strip, the signal strengths of the various reflected spectral components are equalized. U.S. Pat. Nos. 5,745,271 and 5,943,158 are both incorporated by reference herein.

Despite the considerable advantages of these latter proposals, they have several drawbacks. In particular, the nature of optical interference-type devices is such that the membrane or movable layer of the optical cavity has stringent thickness constraints. Furthermore, device performance is wavelength specific. Consequently, a continuing need exists in the art for equalization devices and techniques that enhance optical network performance.

SUMMARY OF THE INVENTION

An array of movable reflective elements provides wavelength independent performance in spectral equalizers and other optical devices in accordance with the principles of the present invention. Each movable reflective element comprises a reflective plate that is suspended by rod-like supports.

Typically, supports that are used in MEMS structures comprise serpentine-shape members. The serpentine configuration is used because it provides a soft and very compact support element and handles compressive and tensile stresses well. On the other hand, the serpentine configuration introduces mechanical softness for both in-plane and out-of-plane translational motion. Out-of-plane softness can disadvantageously decrease the angular range of motion. In fact, under certain conditions, this effect is so pronounced that serpentine-shape supports should not be used. Specifically, it has been discovered that when the supported structure (e.g., a movable plate, etc.) is comparable in size to the serpentine support, only about two thirds of the theoretical rotation attainable from an applied force (e.g., electrostatic, etc.) is observed. The balance of the applied force results in a sag in the serpentine support.

When such a condition exists, a rod-like support having an extraordinarily narrow width, at least in the context of MEMS devices, is advantageously used. The width of the rod-like supports described herein are, in some embodiments, less than about 0.5 microns. Since conventional MEMS fabrication procedures are not capable of producing a support having a width less than about 2 microns, a different approach must be used. In accordance with the principles of the invention, semiconductor processing techniques are used to provide a support having a width that is, in some embodiments, substantially less than 2 microns. The supports, referred to herein as "rod supports" (because of a straight, rod-like structure) are free to twist in torsional motion to allow the reflective plate that is linked thereto to tilt or rotate, with substantially no sagging, about an axis that is aligned with the rod supports.

A method in accordance with the present invention for making an array of movable reflective elements comprises the steps of: forming electrodes in a first substrate; forming a spacer on the first substrate; forming movable reflective elements in a second substrate using semiconductor processing techniques to provide a rod support that has a width that is less than 2 microns; and attaching the second substrate to the first substrate so that the movable reflective elements are proximal to the electrodes.

An improved spectral equalizer incorporates the array of movable reflective elements, a controller, collimating/focusing optics and a diffraction element that optically communicate in a free-space optics arrangement. In use, the collimating/focusing optics of the improved spectral equalizer receives a multiplexed optical signal from an optical fiber and collimates all wavelengths comprising the signal. The collimated multiplexed optical signal impinges upon the diffraction element. The diffraction element diffracts the signal such that the various wavelengths or spectral components of the multiplexed signal spatially separate as they move away from the diffraction element toward the collimating/focusing optics. The optics focus the spatially separated spectral components onto a different one of the movable reflective elements in the array of same, which is located at the Fourier plane (i.e., the back focal plane of the optics).

The movable reflective elements, which are independently movable about an axis of rotation, are directed to rotate a desired angle by the controller. After being reflected by the "tilted" movable reflective elements, the various spectral components are collimated by the collimating/focusing optics and impinge again upon the diffraction element. The diffraction element re-multiplexes the spectral components and directs the re-multiplexed signal to the collimating/focusing optics, which then couples the signal to optical fiber. Since the various movable reflective elements are rotated or tilted, the various spectral components of the re-multiplexed signal are received "off axis" by the optical fiber. Any deviation from the optical axis reduces the intensity or power of a signal that is coupled back into the optical fiber. Therefore, the strength of each spectral component of the original multiplexed signal is individually attenuated to a desired degree to equalize power across the spectrum by selectively rotating the appropriate movable reflective elements.

DETAILED DESCRIPTION OF THE ILLUSTRATIVE EMBODIMENT

The terms listed below are given the following definitions for the purposes of this specification.

Optics means one or more lenses or other elements capable of collimating and/or focusing an optical signal.

Reflective surface means a surface having a fixed or constant reflectivity.

Rod support means an element that supports or suspends another element and that has an arbitrary-shaped cross section (e.g., rectangular, circular, etc.) but is straight along its long axis.

Semiconductor processing techniques mean devices and techniques used for semiconductor processing that are capable of producing feature sizes that are less than about 2 microns, and preferably one micron or less. Illustrative semiconductor processing devices and techniques include step and repeat reduction system (i.e., "stepper"), step and scan aligners, etc.

Spectral component refers to a particular wavelength or narrow range of wavelengths of light. The narrow range includes a peak wavelength and wavelengths that flank the peak wavelength. The peak wavelength, which is usually the center wavelength of the narrow range, has a much higher intensity than the flanking wavelengths. In instances wherein the term "signal" means an optical signal having essentially a single peak wavelength, the terms "spectral component" and "signal" are used interchangeably.

Stress means tensile stress or compressive stress.

Torsional refers to a twisting motion of a support such as results from two opposing turning forces acting at right angles to the rotational axis of the support.

The illustrative embodiment of the invention provides an array of movable reflective elements comprising mirrors or reflective plates that are suspended by exceptionally thin rod supports. The rod supports are free to twist in torsional motion to allow reflective plates that are linked thereto to tilt or rotate about an axis that is aligned with the rod supports. In the illustrative embodiment, the array of movable reflective elements is used to provide an improved spectral equalizer; however, the array can be used to provide improved optical switches, add-drop switches and the like.

Figure 1:
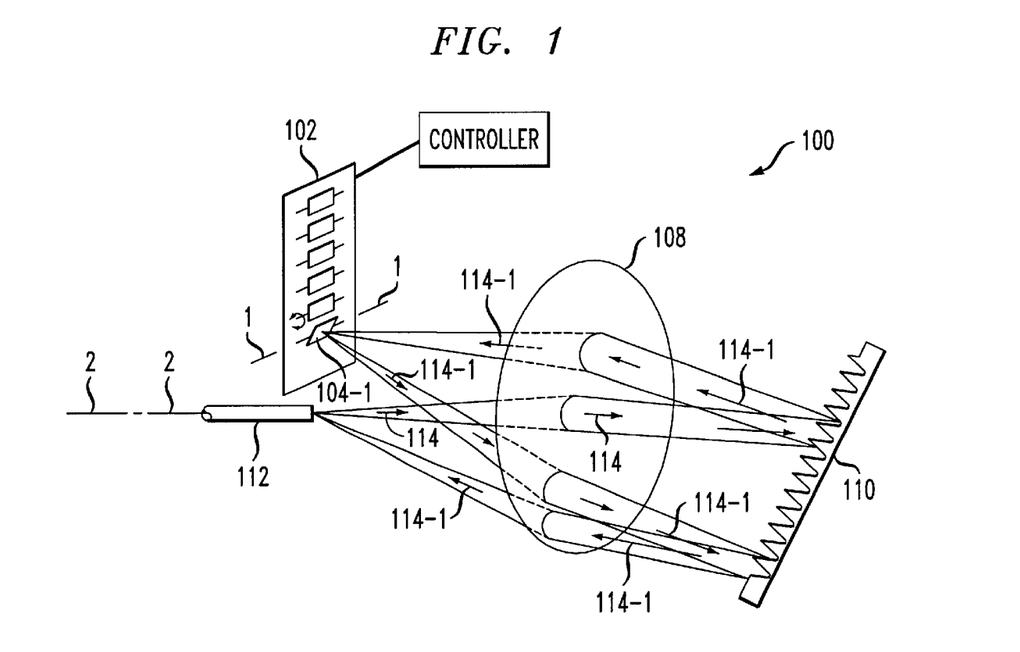
FIG. 1 depicts a spectral equalizer having an array of movable reflective elements in accordance with the illustrative embodiment of the invention.

FIG. 1 depicts improved spectral equalizer 100. The spectral equalizer incorporates array 102 of movable reflective elements 104, controller 106, collimating/focusing optics 108 and diffraction element 110, interrelated in a free-space optics arrangement as shown.

As depicted in FIG. 1, a wave-guide, such as optical fiber 112, delivers multiplexed optical signal 114 to collimating/focusing optics 108. The collimating/focusing optics (hereinafter simply "optics") focuses all of the wavelengths that are emitted by fiber 112 at a substantially infinite conjugate, thereby collimating all of such wavelengths. Optics 108 is an arrangement of one or more lenses that include, without limitation, a standard lens, a graded index (GRIN) lens, a ball lens or an injected molded lens. Such arrangements are well known to and readily designed by those skilled in the art.

Collimated multiplexed optical signal 114 leaving optics 108 impinges upon blazed diffraction element 110. The diffraction element, typically realized as a grating containing a large number of very closely spaced grooves, is capable of dispersing light at an angle that is proportional to its wavelength. Consequently, the various spectral components of the diffracted optical signal spatially separate as they move away from diffraction element 110 toward optics 108. For clarity, FIG. 1 shows only one of such spectral components—signal or spectral component 114-1—which is diffracted from diffraction element 110.

The spatially separated spectral components, such as spectral component 114-1, are directed toward optics 108. Since the spectral components remain collimated when diffracted from diffraction element 110, they will be focused by optics 108 on a surface located at the Fourier plane (i.e., the back focal plane of the optics). And since the spectral components are angularly dispersed, they will each focus at a different location at the Fourier plane as a function of wavelength. That is, the location of focus for each spectral component is laterally shifted along the Fourier plane relative to the other spectral components, as a function of wavelength.

Array 102 of movable reflective elements 104 is advantageously disposed at the Fourier plane. Array 102 has a pitch spacing that is selected so that each spatially resolved spectral component is focused by optics 108 onto a different one of movable reflective elements 104. For example, movable reflective surface 104-1 receives spectral component or signal 114-1.

As described in more detail later in this specification, each movable reflective element 104 is independently movable about an axis of rotation 1-1, as directed by controller 106. In FIG. 1, movable reflective element 104-1 is rotated some desired angle about axis of rotation 1-1. As a consequence, for any rotated element 104, the incoming and outgoing signals are not coincident. That is, the path that signal 114-1 follows to optics 108 from movable reflective element 104-1 is different than the path that signal 114-1 follows from optics 108 to movable reflective element 104-1.

After being reflected by movable reflective element 104-1, spectral component 114-1 is collimated by optics 108 and impinges again upon diffraction element 110. The signal returned from diffraction element 110 is then received by optics 108 and coupled into optical fiber 112. Since movable reflective element 104-1 is rotated or tilted, the returning signal or spectral component 114-1 is received by fiber 112 "off-axis." That is, the signal is received at a non-zero angle relative to optical axis 2-2.

Figure 10:
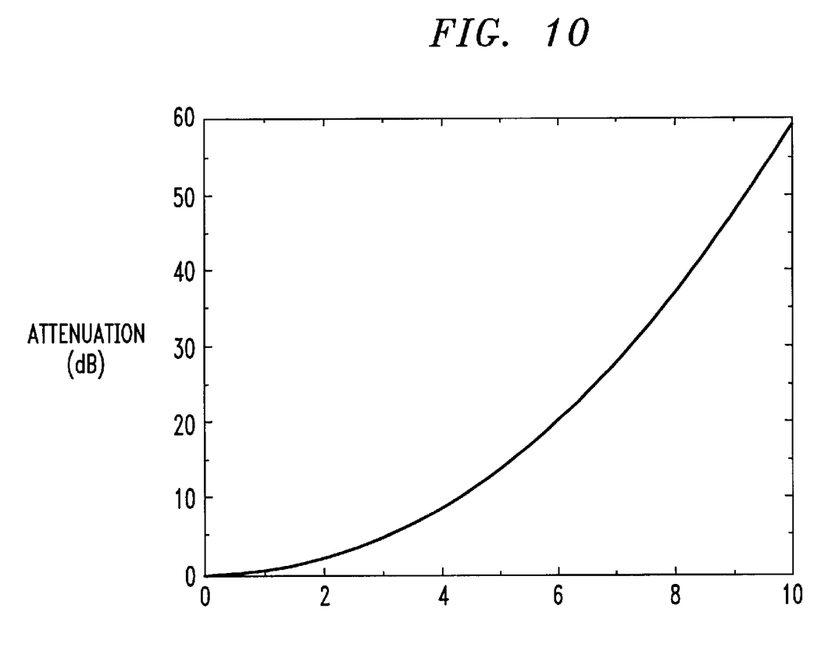
FIG. 10 depicts a plot of signal attenuation as a function of the rotation of the movable reflective element.

It is well known that for light to be coupled into an optical fiber, it must be received within the fiber's "acceptance angle." For single mode fiber, the "half" acceptance angle is about 5 degrees. Any deviation from optical axis 2-2 reduces the intensity or power of a signal that is coupled into fiber 112. Therefore, the strength of each spectral component of multiplexed signal 114 can be individually attenuated to a desired degree by selectively rotating an appropriate movable reflective element 104. If the returning signal deviates by more than the half acceptance angle, minimal power is coupled into the fiber. In other words, the signal is dropped. FIG. 10 depicts signal attenuation (dB) as a function of the rotation of movable reflective elements 104 for the arrangement shown in FIG. 1 with single mode fiber.

A variety of control arrangements whereby controller 106 instructs array 102 to selectively attenuate signal strength of the spectral components can be used. See, e.g., U.S. Pat. No. 5,745,271. In one variation, an operator determines the intensity of the incoming spectral components (i.e., before attenuation) and/or outgoing spectral components (i.e., after attenuation). In another variation, an automated control system is used, wherein detectors are used to read the intensity of incoming and/or outgoing spectral components. In either variation, the intensity information is provided to controller 106, which then determines what fraction of the incident power of each spectral component 114-i is to be coupled into fiber 112 in known fashion and accordingly adjusts a voltage signal being delivered to the appropriate movable reflective elements 104 to obtain a desired rotation. A variety of other control methodologies will occur to and can be implemented by those skilled in the art in view of this disclosure.

Having described the overall configuration of an improved spectral equalizer in accordance with the present invention, movable reflective elements 104 are now described in further detail.

Figure 2:
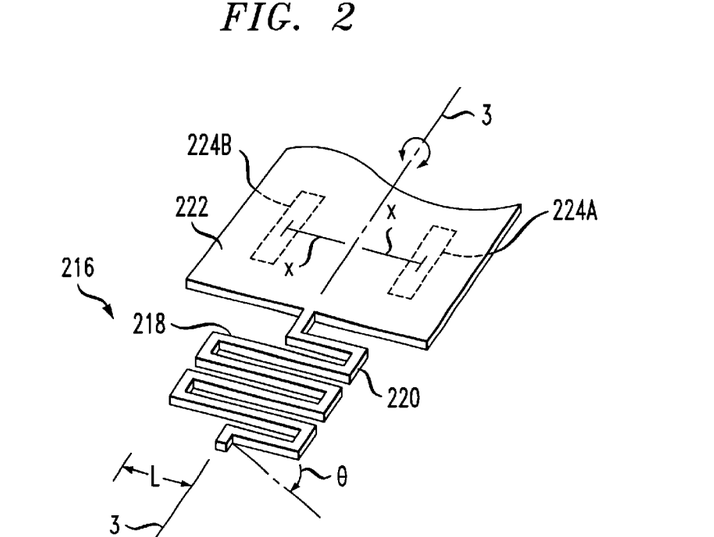
FIG. 2 depicts a movable reflective element having a serpentine support.

Micro-electromechanical systems (MEMS) devices, such as array 102 of movable reflective elements 104, typically use supports to suspend plates or other elements for movement. Such supports usually have a serpentine configuration. Support 216 depicted in FIG. 2 illustrates a standard serpentine configuration comprising a plurality of relatively longer members 218 that are orthogonal to an axis of rotation 3-3 and a plurality of relatively shorter members 220 that are substantially parallel with rotation axis 3-3 and that connect each longer member 218.

The serpentine configuration provides a way of making a very compact "torsional" spring. In particular, as a potential difference is applied across plate 222 and one of underlying electrodes 224A or 224B, an electrostatic force is generated that draws one side of plate 222 downward toward the energized electrode. Members 218 of support 216 move about axis of rotation 3-3 to accommodate the motion of plate 222.

Furthermore, the serpentine configuration handles both compressive and tensile stress quite well. Specifically, the serpentine arrangement of longer and shorter members either expands or compresses, as appropriate, in response to the release of such stresses from, for example, plate 222 as it is released during fabrication (i.e., rendered free to move as a result of removing surrounding layers).

Figure 3:
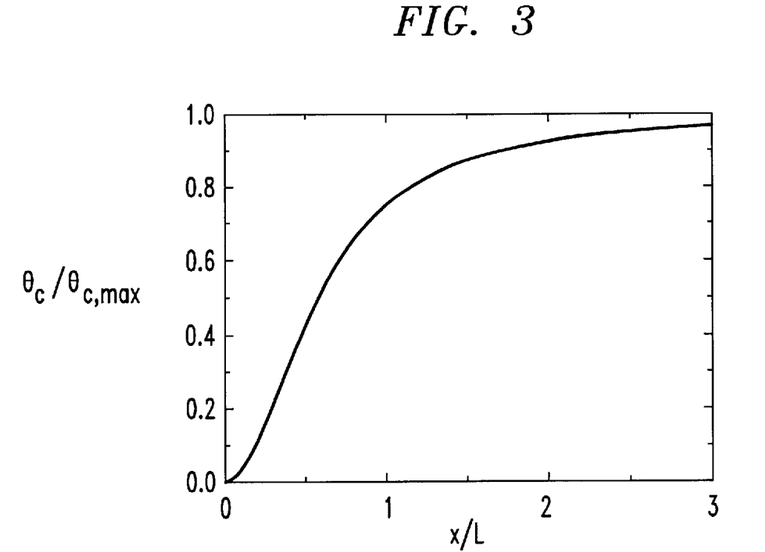
FIG. 3 depicts a plot that shows the ability of a serpentine support to rotate as a function configuration parameters.

In addition to the torque that is created (electrostatically) by applying a voltage across one of electrodes 224A or 224B and plate 222, a net force acts downward on support 216. Unfortunately, supports having a serpentine-shaped configuration such as support 216 will move in non-torsional (i.e., non-twisting) motion in response to such a force as a consequence of a relatively low spring constant. In particular, in response to the net downward-acting force, support 216 is urged to move downward. FIG. 3, which is a plot of the expression $$\theta_c/\theta_{c,\,max} = (3x^2/L^2)/((1+(3x^2/L^2)), \qquad [1]$$

illustrates this susceptibility in graphical fashion.

FIG. 3 plots the reduced rotation angle of a plate that is attached to a support having a serpentine configuration. The reduced rotation angle is a ratio of a calculated rotation angle $\theta_c$, versus a desired maximum rotation angle $\theta_{c,\,max}$. A reduced rotation angle (ratio) of less than 1 evinces non-torsional motion of the support. Reduced rotation angle is plotted as a function of the parameter x/L, wherein x is the distance from rotation axis 3-3 to the centerline of electrodes 224A, 224B (distance measured in the plane of plate 222) and L is one-half the length of member 218 (see FIG. 2);

FIG. 3 shows that for small values of x/L, such as when L is about equal to x, a substantial amount (i.e., about 30 percent) of non-torsional movement of a serpentine-shaped support occurs. In other words, an undesirably small rotation of plate 222 is obtained. As parameter x/L increases, such as by decreasing the length of member 218, non-torsional motion of the support decreases and plate rotation increases. Non-torsional motion is advantageously limited to about 10 percent or less (i.e., x/L is about 2 or more).

Figure 4:
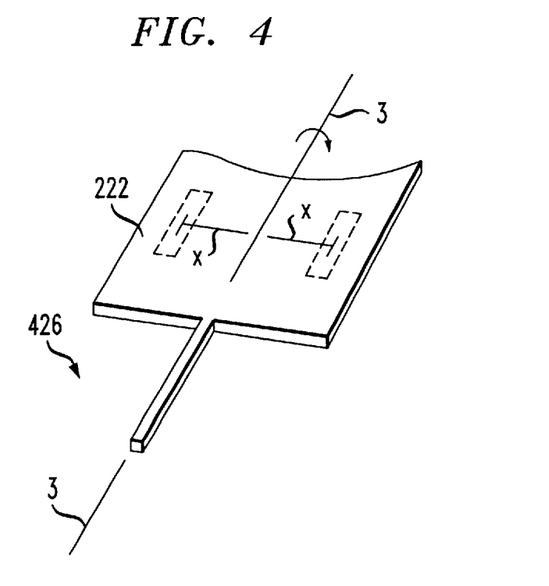
FIG. 4 depicts a movable reflective element having a straight rod support.

In this regard, a support configured as a straight "rod," such as support 426 depicted in FIG. 4, reduces non-torsional motion (since the value of "L" is very small for a rod).

While known in the art, the use of rod-shaped supports is problematic here. Specifically, consider a support that is similar to support 426 and that has a width of about 2 microns, which is a nominal minimum feature size for MEMS structures (such as array 102), and a thickness of 1 micron. For this configuration, the required length of the support will be hundreds of microns as a function of voltage and several other factors. Consequently, the support will be substantially longer than plates 222 (typically about 50–60 microns in length) suspended thereby. This is a problem because it is desirable to have movable reflective elements 104 very close to one another (e.g., 1 micron apart) in array 102. Lengthy supports, such as would be required for this illustration, will not be capable of preventing adjacent movable reflective elements 104 from contacting (and sticking to) one another due to the play exhibited by such lengthy supports. Consequently, a support having a width of 2.0 microns, and often even one micron, is not viable for use in conjunction with the present invention.

Notwithstanding the shortcomings of the aforedescribed serpentine-configured support, it would, therefore, have hitherto been used in preference to a rod-shaped support such as described above. But in accordance with the illustrated embodiment of the present invention, this compromise is avoided by using semiconductor-processing techniques, as opposed to standard MEMS fabrication techniques, to fabricate rod supports having a width that is, as might be required, substantially less than 2 microns.

In fact, in accordance with some specific embodiments in accordance with the principles of the invention, support 426 has a width that is less than about 0.5 microns, and advantageously in the range of about 0.25 to 0.35 microns. Supports having such a width will generally provide an acceptable length for the rod supports for use in conjunction with the devices described herein. TABLE I below provides a comparison of length (in microns) for rod supports having widths of 0.25 microns, 0.50 microns and 1.0 micron, and a thickness of 1 micron, for two values of applied voltage (in volts).

TABLE I

Support Length as a Function of Support Width

| Width | Voltage | Length |
|---|---|---|
| 1.0 | 100 | 295 |
|  | 150 | 130 |
| 0.50 | 100 | 59 |
|  | 150 | 26 |
| 0.25 | 100 | 9 |
|  | 150 | 4 |

The fabrication method used to form an array of movable reflective elements in accordance with the principles of the invention includes a combination of MEMS and semiconductor processing techniques. Further description of the method is deferred until several variations of the illustrative array are described thereby providing context for the description of the method.

Figure 5:
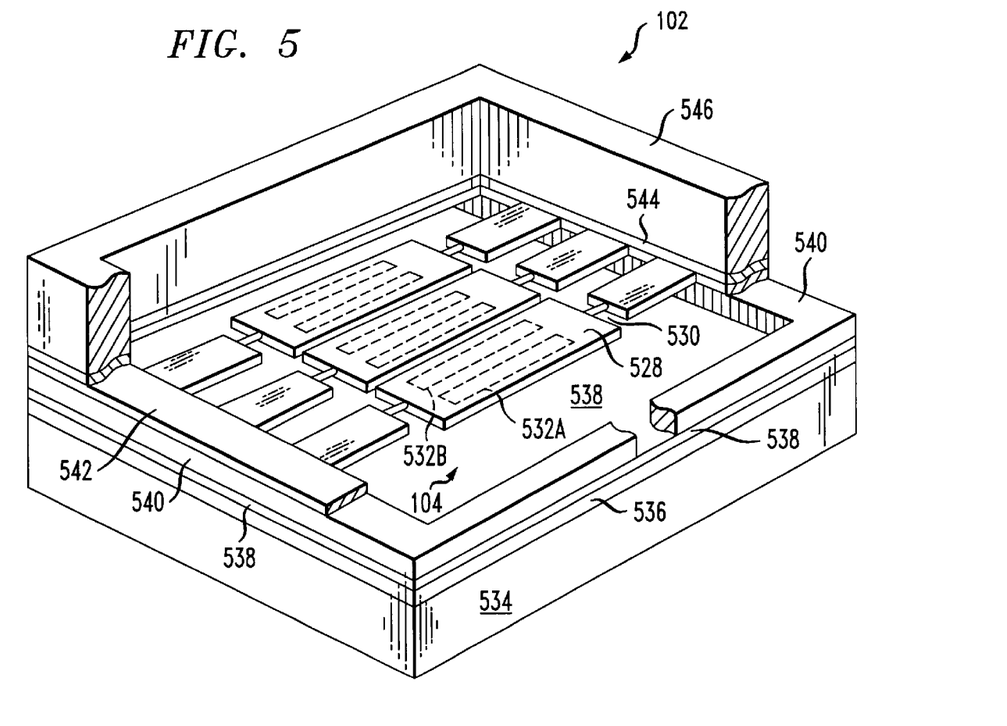
FIG. 5 depicts a perspective view of an array of movable reflective elements in accordance with the illustrative embodiment of the invention.

FIG. 5 depicts a perspective view of an array 102 of movable reflective members 104 in accordance with the illustrative embodiment of the invention. Each movable reflective member 104 comprises plate 528 and two rod supports 530.

Plate 528 has length and width dimensions that are advantageously in the range of tens of microns to about one hundred microns. For example, in one embodiment in accordance with the principles of the invention, plate 528 has a length of 60 microns and a width of 27 microns. Plate 528 advantageously has a thickness of about 1 micron. Adjacent plates are advantageously separated by about 1 micron. A layer of metal (not shown) is disposed on each side of plate 528 to provide a reflective surface and/or an electrically conductive surface. Each rod support has a width that is less than about 0.5 microns, and more preferably in the range of about 0.25 to 0.35 microns.

Rod supports 530 have a length that is advantageously less than about one-half the width of plate 528 (i.e., for this example, 0.5×27=13.5 microns). In some embodiments in accordance with the principles of the invention, such as for the configuration described above wherein plate 528 has a length of 60 microns and a width of 27 microns, the width of rod supports 530 are advantageously in the range of about 4 to 10 microns. Rod supports 530 will typically have the same thickness as plate 528 (i.e., 1 micron).

A first end of each rod support 530 depends from plate 528. The rod supports depend from opposite edges of plate 528. A second end of each of rod supports 530 depends from a portion of frame 542. Rod supports 530, in conjunction with frame 542, suspend plate 528 over two underlying electrodes 532A and 532B which are disposed on layer 538. Spacer 540 elevates frame 542 above layer 538.

As a voltage is applied across one of plates 528 and one of underlying electrodes 532A or 532B, an electrostatic force is generated. The portion of plate 528 that overlies the energized electrode is attracted to the energized electrode by the electrostatic force. Rod supports 530 twist to allow plate 528 to tilt towards energized electrode 532A or 532B. The amount of voltage supplied controls the angle θ by which plate 528 tilts from its quiescent or unactuated position.

In the illustrative embodiments, the force that rotates plates 528 is generated electrostatically. It is known that instability occurs when the displacement of an element equals or exceeds about ⅓ of the gap between the attracting elements (in this case, plate 528 an underlying electrode 532A or 532B). Thus, the displacement of plates 528 in the vertical direction is restricted to a distance that is less than ⅓ of the distance between plate 528 and the energized underlying electrode 532A or 532B, as measured at distance x from the axis of rotation of plate 528 (see, e.g., FIG. 4). This defines critical angle $\theta_c$. Plates 528 cannot be rotated up to or beyond the critical angle. Those skilled in the art can readily develop expressions for calculating the critical angle as a function of: plate dimensions, the gap between the plate and electrode and other parameters, as well as voltage requirements to obtain a specified amount of rotation.

Figure 6:
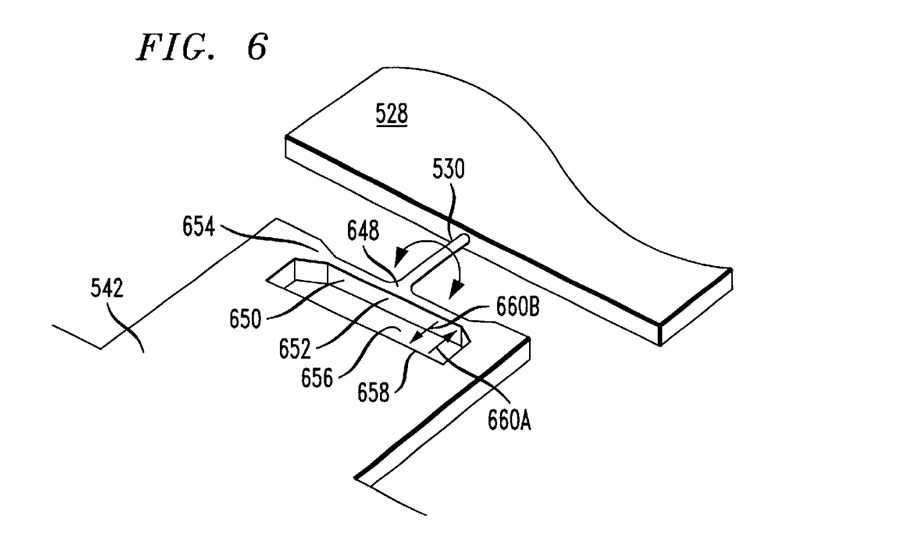
FIG. 6 depicts a first configuration of a movable reflective element, a rod support and stress relief element.

The material (e.g., silicon, etc.) that rod supports 530 and plates 528 are made from might be, and typically will be, under either compressive or tensile stress. When such stress is released during fabrication steps, the unusually narrow rod supports 530 described herein might buckle or tear. Consequently, movable reflective elements 104 advantageously incorporate a stress-relief element that absorbs stress that is released by plate 528, etc., during fabrication to reduce the likelihood of damage to rod supports 530. FIG. 6 depicts an illustrative stress-relief element suitable for use in conjunction with movable reflective elements 104 described herein.

The illustrative stress-relief element depicted in FIG. 6 comprises thin stress relief member 650 that is supported for flexion by a portion of frame 542. Member 650 has dimensions similar to that of rod supports 530. In one arrangement that allows for flexion, each end of thin member 650 depends from tapered regions 654 of frame 542. Second end 648 of rod support 530 is linked or otherwise depends from member 650. Other than these points of contact, member 650 is free to move; opening 656 in frame 542 is provided to this end. Opening 656 advantageously provides at least about 1.5 microns of travel towards edge 658 (when stress relief members 650 are about the same size as rod supports 530).

As rod support 530 receives stress that tends to pull it away from frame 542 (i.e., the release of tensile stress in plate 528) or push it towards frame 542 (i.e., the release of compressive stress in plate 528), member 650 flexes in direction 650A or 650B to accommodate the "pulling" or "pushing" motion imparted by rod 530. In the absence of such stress relief, rod 530 might buckle upon the release of compressive stress or tear away from frame 542 upon release of tensile stress. To maximize the stress relief afforded by member 650, rod 530 advantageously links to midpoint 652 of member 650.

Figure 7:
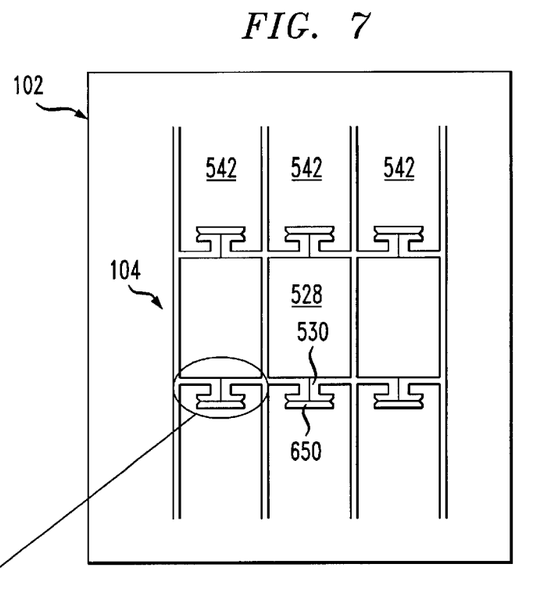
FIG. 7 depicts a variation of the array of movable reflective elements shown in FIG. 5.

FIG. 7 depicts a plan view of a variation of array 102. In this variation, there is less open space between individual movable reflective elements 104 and surrounding frame 542 than for the variation of array 102 depicted in FIG. 5. The configuration depicted in FIG. 7 is expected to further decrease the mortality of rod supports 530 and stress relief members 650 during fabrication.

Figure 8:
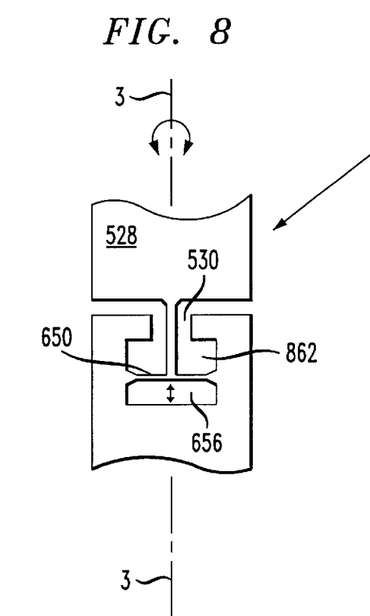
FIG. 8 depicts a second configuration of a movable reflective element, rod support and stress relief element.

In the variations of array 102 shown in FIG. 5 and FIG. 7, adjacent movable reflective elements 104 are separated by about 1 micron. But the gap between plate 528 and frame 542 is substantially less for the variation of array 102 depicted in FIG. 7 than for the variation depicted in FIG. 5. In particular, in FIG. 5, plates 528 are separated from frame 542 by the length of rod supports 530. But the separation between these same elements in FIG. 7 amounts to a minor fraction of the length of rod supports 530. FIG. 8 depicts detail concerning this configuration.

As depicted in FIG. 8, stress relief member 650 is recessed a distance into frame 542 rather than being located at the edge of frame 542 proximal to plate 528 (see, e.g., FIG. 6). Consequently, plate 528 is closer to frame 542, even though the length of rod 530 has not changed. For example, in one configuration in accordance with the illustrative embodiment of the present invention, stress relief member 650 is sufficiently recessed so that plate 528 and frame 542 are separated by only about 1.5 microns. Openings 656 and 862 are provided to release stress relief member 650 and rod 530 such that they are free to move.

Figure 9:
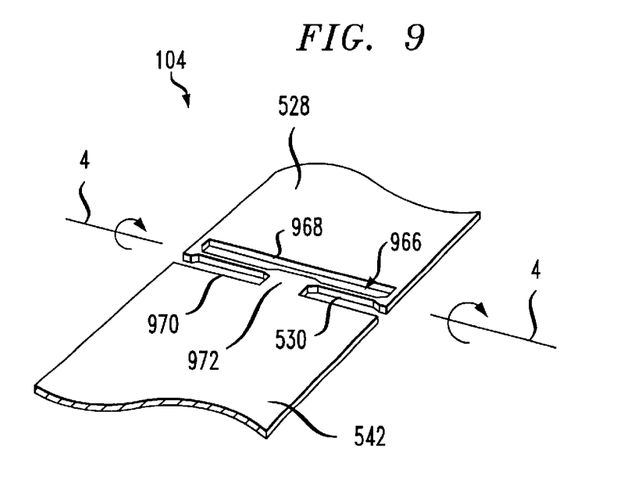
FIG. 9 depicts a movable reflective element that is supported at one end thereof in cantilevered fashion.

Movable reflective elements 104 that have been described and illustrated thus far have been supported on two opposite edges of plate 528 such that the axis of rotation is aligned with the supports (i.e., rods 530). In a further variation in accordance with the illustrative embodiment of the present invention, movable reflective elements 104 are cantilevered such that they are supported on only one side thereof. FIG. 9 depicts movable reflective element 104 supported in cantilevered fashion.

In movable reflective element 104 depicted in FIG. 9, two rod supports 530 mechanically link plate 528 to frame 542; in other variations more or fewer rods are suitably used. In the embodiment depicted in FIG. 9, both rod supports 530 are disposed along edge 966 of plate 528. One end of each of rod supports 530 depends from plate 528 and the other end of each of rod supports 530 depends from protruding portion 972 of frame 542.

When supported in cantilevered fashion, plate 528 will typically have a somewhat shorter length than when doubly supported. For example, in one embodiment, cantilevered plate 528 has a length of 40 microns and a width of 27 microns. Like the previous embodiments, plate 528, when cantilevered, advantageously has a thickness that is about 1 micron and adjacent plates are separated by about 1 micron. As before, each rod support 530 for use with cantilevered plates 528 has a very small width (i.e., less than about 1 micron, and often in the range of about 0.25 to 0.35 microns, such as when cantilevered plate 528 has a length of 40 microns and a width of 27 microns).

Rod supports 530 have a length that is advantageously less than one-half of the width of cantilevered plate 528. For example, in the embodiment described in which illustrative cantilevered plate 528 has a length of 40 microns and a width of 27 microns, the width of rod supports 530 are advantageously in the range of about 4 to 10 microns. Rod supports 530 will typically have the same thickness as plate 528 (e.g., 1 micron). Rod supports 530 are advantageously spaced about 2 microns from recessed edge 968 of plate 528 and about 2 microns from edge 970 of frame 542.

An electrode (not shown) is disposed beneath cantilevered movable reflective element 104, and is offset from axis of rotation 4-4 that is defined by rod supports 530. As the electrode is energized, plate 528 moves toward the electrode, rotating about axis 4-4.

Figure 11:
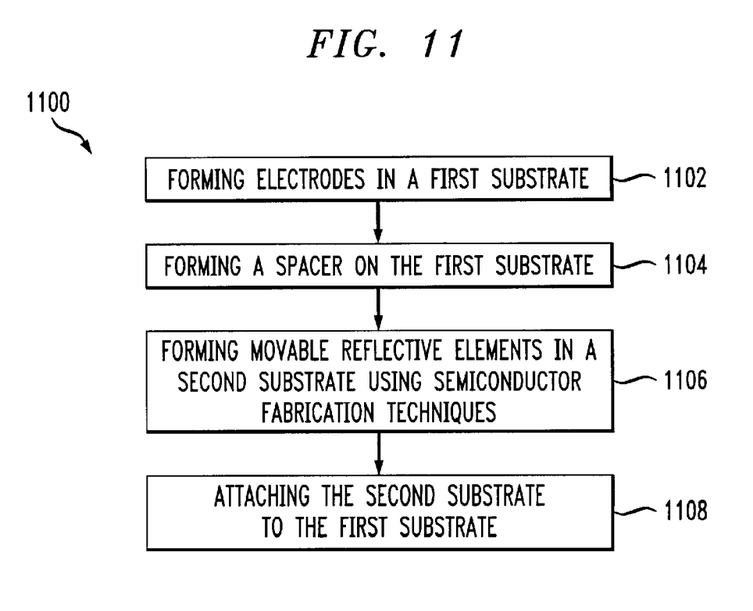
FIG. 11 depicts a flow diagram of a method for forming an array of movable reflective elements in accordance with the illustrative embodiment of the invention.

FIGS. 5 and 11–17 and the accompanying text provide a description of an illustrative fabrication method for array 102 of movable reflective elements 104 described herein. Method 1100, which is depicted via flow diagram in FIG. 11, includes the operations of:

forming electrodes 532A and 532B in a first substrate (1102);

forming a spacer on the first substrate (1104);

forming movable reflective elements in a second substrate using semiconductor fabrication techniques to provide a rod support having a length that is less than about one half the width of the plate (reflector) and a width less than 2 microns (1106), and in most embodiments less than about 1 micron; and attaching the second substrate to the first substrate so that the movable reflective elements are proximal to the electrodes (1108).

These operations are described in further detail below.

Figure 12:
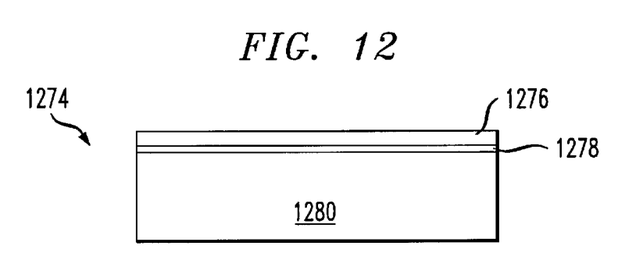
FIG. 12 depicts a conventional silicon-on-insulator wafer.

The first and second substrates advantageously comprise three layers, although three-layer substrates are not necessary for fabricating array 102. An illustrative three-layer substrate 1274 is depicted in FIG. 12. Substrate 1274 includes top, relatively thin layer 1276, bottom, relatively thick layer 1280 and intermediate, relatively thin layer 1278 that is sandwiched between the top and bottom layers.

In the processing steps that follow, thin layer 1278 serves as a "stop-etch" layer. Layer 1278, therefore, advantageously comprises a material that is different from the material(s) used for layers 1276 and 1280 and etches, in at least certain etchants, much more slowly that layers 1276 and 1280.

In one embodiment, substrate 1274 comprises a silicon-on-insulator ("SOI") wafer. Such wafers typically comprise a bottom bulk or "thick" silicon layer (about 500 to 700 microns in thickness as a function of wafer diameter) that corresponds to layer 1280. The thick silicon layer of an SOI wafer is commonly referred to as the "handle side" of the wafer. An SOI wafer also includes an insulating layer (about 0.2 to 3 microns in thickness) that is disposed on the thick silicon layer. The insulating layer, which corresponds to layer 1278 in substrate 1274, is typically an oxide layer (e.g., silicon dioxide). The insulating layer is commonly referred to as a "buried" oxide layer or "BOX" layer since it is sandwiched between the top and bottom layers of the SOI wafer. And an SOI wafer includes a "thin" silicon layer (about 0.1 to 10 microns) that is disposed on top of the BOX layer. The thin silicon layer corresponds to layer 1276 in substrate 1274. The SOI wafer is particularly useful for fabricating the structures described herein because the BOX layer provides an excellent "stop-etch" layer for the surrounding silicon layers. SOI wafers are commercially available from SOITEC USA, Inc. of Peabody, Mass. and others.

In another embodiment, substrate 1274 comprises a layer of metal (layer 1276) that is disposed on a layer of oxide (layer 1278) that is, in turn, disposed on a silicon wafer (layer 1280). For the description that follows, each of the two substrates used to form array 102 of movable reflective elements 104 are assumed to be SOI wafers.

Figure 13:
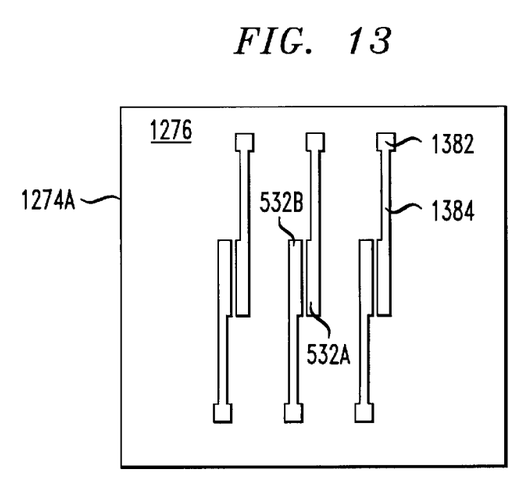
FIG. 13 depicts electrodes that are patterned in a thin silicon layer of a first silicon-on-insulator wafer in a step for fabricating an array of movable reflective elements.
Figure 14:
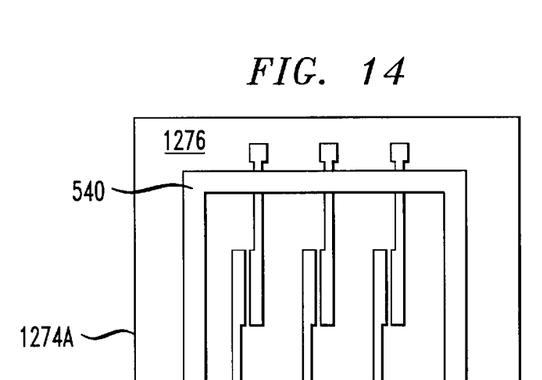
FIG. 14 depicts a spacer that is disposed on the first silicon-on-insulator wafer of FIG. 11.
Figure 15:
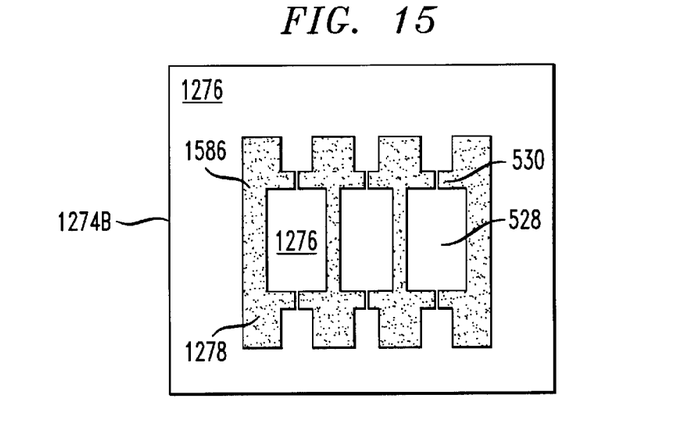
FIG. 15 depicts nascent movable reflective elements that are patterned in a thin silicon layer of a second silicon-on-insulator wafer in a step for fabricating an array of movable reflective elements.

In accordance with operation 1102 of method 1100 (FIG. 11), electrodes are patterned in one of the substrates 1274A using standard photolithographic techniques. The electrodes (e.g., electrodes 532A and 532B see FIG. 5) are patterned in thin silicon layer 1276A, as depicted in FIG. 13. The etching of electrodes proceeds to BOX layer 1278A. A variety of silicon etchants can be used, including, for example, $XeF_2$ (xenon difluoride), alkali hydroxides (KOH, etc.), TMAH (tetramethyl-ammonium hydroxide), EDP (ethylene diamine pyrocatechol), etc. Contact pads 1382 and electrically conductive traces 1384 are formed for each electrode. Metal (e.g., gold, etc.) is deposited on each contact pad 1382.

Spacer 540 is formed on layer 1276A in accordance with operation 1104. To do so, a layer of oxide or other appropriate material is deposited on layer 1276A and then patterned and etched to the desired shape. Again, standard photolithographic techniques are used to form spacer 540A (see FIG. 5). At the conclusion of operation 1104, the lower half of array 102 depicted in FIG. 5 has been formed. In particular, with reference to FIG. 5, layer 534 corresponds to thick layer 1280A, layer 536 corresponds to BOX layer 1278A, layer 538 in which electrodes are patterned corresponds to thin silicon layer 1276A of substrate 1274A and layer 540A is the spacer. Contact pads 1382 and electrically-conductive traces 1384, which are shown in FIG. 13, are not depicted in FIG. 5 for the sake of clarity.

In accordance with operation 1106 of method 1100, movable reflective plates 104, including plates 528, rod supports 530 and, optionally, stress relief members 650 are formed in second substrate 1274B using semiconductor processing techniques. For example, a step and repeat reduction system, commonly referred to as a "stepper" is advantageously used to form such elements. In contrast to contact masks, as are typically used in MEMS processing, the stepper is able to provide a feature size as small as about 0.25 microns. The smaller feature size is possible using a stepper because light having a shorter wavelength can be used, among other reasons. While not hitherto used in the fabrication of MEMS-type devices, steppers are well known to those skilled in the art of semiconductor processing.

Operation 1106 requires several sub-operations. In one such sub-operation, plate- and rod-shaped regions are defined or patterned in layer 1276B of second wafer 1274B. This patterning is performed using a stepper to obtain rod supports having a width of less than 2 microns, the practical limit for MEMS processing. This process is subtractive whereby portions of layer 1276B are etched away exposing region 1586 of BOX layer 1278B (shown as a "stippled" region in FIG. 15). Remaining isolated regions of layer 1276B have the required shape of plates 528 and rod supports 530.

Figure 16:
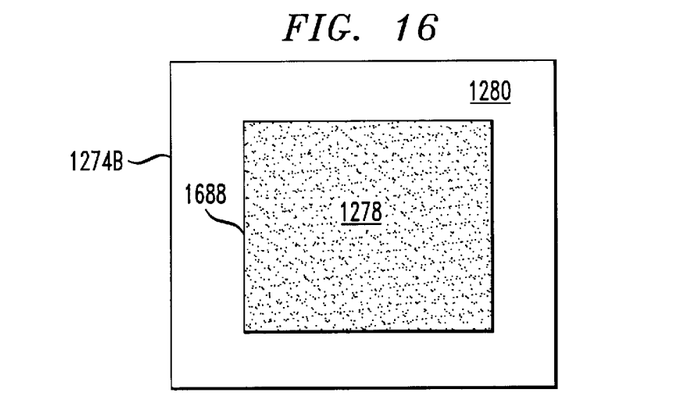
FIG. 16 depicts the handle side of the second silicon-on-insulator wafer after a portion of the thick silicon layer is etched away to expose the BOX layer in a step for fabricating an array of movable reflective elements.

In another sub-operation of operation 1106, a portion of handle side of second wafer 1274B is etched down to BOX layer 1278B. Etched region 1688 must be large enough to encompass region 1586 of BOX layer 1278B that was exposed through layer 1276B (see FIG. 15). Deep reactive ion etching is advantageously used to etch through thick silicon layer 1280B. Deep reactive ion etching, which is known to those skilled in the art, is capable of obtaining aspect ratios as high as about 50/1 (depth/width). Laser milling can also be used for etching through thick silicon layer 1280B.

Figure 17:
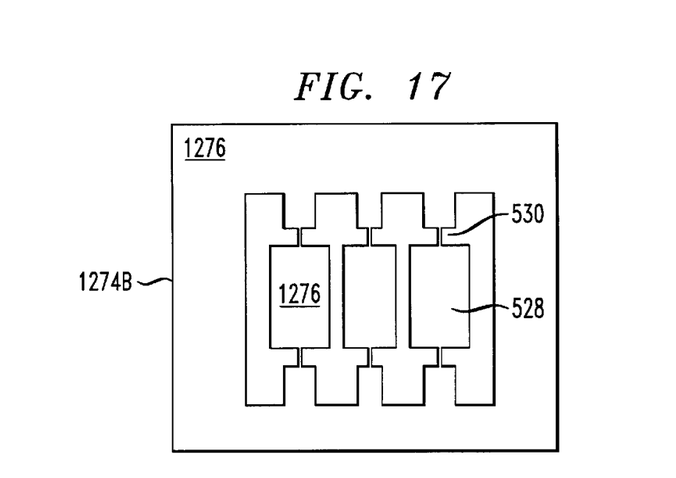
FIG. 17 depicts the second silicon-on-insulator wafer after the movable reflective elements and rod supports are released in a step for fabricating an array of movable reflective elements.

In a further sub-operation of operation 1106, exposed portion 1688 of BOX layer 1278B is stripped in known fashion, thereby releasing plates 528 and rods 530. FIG. 17 depicts substrate 1274B after plates 528 and rods 530 have been released.

At the conclusion of operation 1106, the upper half of array 102 depicted in FIG. 5 has been formed. In particular, with reference to FIG. 5, layer 542 (in which rods 530 and plates 528 are formed) corresponds to thin silicon layer 1276B, layer 544 corresponds to BOX layer 1278B and layer 546 corresponds to thick silicon layer 1280B.

In accordance with operation 1108, substrate 1274A and substrate 1274B are joined forming array 102 depicted in FIG. 5. In doing so, second substrate 1274B is "flipped" such that its top layer—layer 1276B (in which plates 528 and rods 530 are formed)—abuts spacer 540A that is disposed above top layer 1276A of first substrate 1274A. The substrates can be joined by fusion bonding, by adhesives or by bump bonding.

It is to be understood that the above-described embodiments are merely illustrative of the invention and that many variations may be devised by those skilled in the art without departing from the scope of the invention and from the principles disclosed herein. It is therefore intended that such variations be included within the scope of the following claims and their equivalents.

What is claimed is:

1. Article comprising:
   a plurality of movable reflective elements, at least some of which receive an optical signal, wherein said optical signal received by each one of said some movable reflectve elements is different, wherein each of said reflecting elements comprises:
      a plate having a reflective surface; and
      a first rod support having a first end and a second end, wherein:
         said first end of said first rod support depends from said plate;
         said first rod support supports said plate for movement;
         said first rod support has a width that is less than about 0.5 microns.

2. The article of claim 1, wherein said movable reflective elements further comprise a stress-relief member, wherein a second end of said first rod support is attached to said stress-relief member.

3. The article of claim 2 wherein said stress-relief member comprises a fist end and a second end, and wherein said stress-relief member is supported at said first end and said second end thereof, and further wherein said second end of said first rod support is attached to said stress relief member midway between said first end and said second end of said stress relief member.

4. The article of claim 3 wherein said first end of said first rod support depends from a first side of said plate;
   and further comprising a second rod support having a first end and a second end, wherein said first end of said second rod support depends from a second side of said plate, and wherein said second rod support supports said plate for movement and has a width that is less than about 0.5 microns, and further wherein said first rod support and said second rod support collectively define an axis of rotation of said plate.

5. The article of claim 4 wherein said axis of rotation of said plate is aligned with a symmetry axis of said plate.

6. The article of claim 3 wherein a distance between said first end of said first rod support and said second end of said first rod support is less than about 10 microns.

7. The article of claim 6 wherein said each end of said stress relief member depends from a frame, and wherein a distance between said plate and said frame is less than about 2 microns.

8. The article of claim 6 wherein adjacent movable reflective elements are spaced from one another by about 1 micron.

9. The article of claim 4 further comprising a plurality of electrodes, wherein at least one said electrode is disposed beneath each said plate and is offset from said axis of rotation of each said plate.

10. The article of claim 1 further comprising a second rod support having a first end and a second end, wherein said first end of said second rod support depends from said plate, and wherein said second rod support supports said plate for movement and has a width that is less than about 0.5 microns, and further wherein:

a second end of said first rod support and a second end of said second rod support are attached to a frame;

said first rod support and said second rod support collectively define an axis of rotation of said plate; and said axis of rotation is near a side of said plate.

11. The article of claim 10 further comprising a plurality of electrodes, wherein at least one said electrode is disposed beneath each said plate and is offset from said axis of rotation of each said plate.

12. The article of claim 11 wherein a distance between said first end of said first rod support and said second end of said first rod is less tan about 10 microns.

13. The article of claim 1 wherein said different optical signal received by each of said some movable reflective elements has a different center wavelength.

14. The article of claim 13 further comprising a diffraction element that spatially separates a multiplexed optical signal into a plurality of spectral components, each of which is directed along a separate optical path to be received by one of said movable reflective elements as said received optical signal.

15. The article of claim 14 further comprising optics, wherein:

said multiplexed optical signal is delivered, via a waveguide, to said optics;

said optics collimates said multiplexed optical signal;

said diffraction element receives said collimated multiplexed optical signal;

said optics receive said plurality of spectral components from said diffractioln element and directs each to a different one of said movable reflective elements, each of which movable reflective elements reflects said spectral components;

said optics receive said reflected spectral components and collimates them;

said difraction element receives said collimated spectral components and remultiplexes them into a second multiplexed optical signal;

said optics receives said second multiplexed optical signal and directs it to said waveguide.

16. The article of claim 15 wherein at least one of said movable reflective elements is moved about an axis of rotation from a first position to a second position to selectively attenuate at least one of said spectral components, wherein said second position is individually selected for each said movable reflective element, and wherein:

at said first position, said one spectral component is received by said movable reflective element at a first angle of incidence such that, upon reflection, said one spectral component is received by said waveguide along an optical axis thereof; and at said second position, said one spectral component is received by said movable reflective element a second angle of incidence such that, upon reflection, said one spectral component is received by said waveguide at a non-zero angle with respect to said optical axis thereby coupling only a portion of said one spectral component's power into said waveguide.

17. The article of claim 1, wherein said width of said rod-support is within a range of about 0.25 to about 0.35 microns.

18. A method comprising:

forming electrodes in a first substrate;

forming a spacer on the first substrate;

forming movable reflective elements in a second substrate using a semiconductor processing techniques, said movable reflective elements comprising:

a feature having a width that is less than about 0.5 microns; and attaching said second substrate to said first substrate so that the movable reflective elements are proximal to said electrodes.

19. The method of claim 18 wherein said first substrate comprises three layers.

20. The method of claim 18 wherein said second substrate comprises three layers.

21. The method of claim 20 wherein said feature comprises a rod support.

22. The method of claim 21 wherein said feature further comprise a stress relief member.

* * * * *